(12) United States Patent
Hosono et al.

(10) Patent No.: US 10,007,005 B2
(45) Date of Patent: Jun. 26, 2018

(54) RADIATION DETECTOR, RADIATION DETECTION APPARATUS, AND METHOD OF MANUFACTURING RADIATION DETECTOR

(71) Applicant: KABUSHIKI KAISHA TOSHIBA, Tokyo (JP)

(72) Inventors: Yasuharu Hosono, Kanagawa (JP); Kazunori Miyazaki, Kanagawa (JP); Go Kawata, Kanagawa (JP); Mitsuyoshi Kobayashi, Tokyo (JP); Rei Hasegawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 224 days.

(21) Appl. No.: 15/156,586

(22) Filed: May 17, 2016

(65) Prior Publication Data

US 2016/0349382 A1 Dec. 1, 2016

(30) Foreign Application Priority Data

May 28, 2015 (JP) ................................ 2015-108765

(51) Int. Cl.
*G01N 23/00* (2006.01)
*G01T 1/20* (2006.01)

(52) U.S. Cl.
CPC .......... *G01T 1/2018* (2013.01); *G01T 1/2002* (2013.01)

(58) Field of Classification Search
CPC ....... G01T 1/20; G01T 1/2018; G01T 1/2012; G01N 23/04; G01N 23/046; G01N 23/08; G01N 23/083; G01N 2223/505; A61B 6/4208; A61B 6/4216

USPC ................................. 378/19; 250/336.1, 367
See application file for complete search history.

(56) References Cited

U.S. PATENT DOCUMENTS

| 6,823,038 B2 | 11/2004 | Von Der Haar |
| 7,244,942 B2* | 7/2007 | Andreaco ............. G01T 1/2002 250/367 |
| 2007/0085088 A1 | 4/2007 | Sekine et al. |

(Continued)

FOREIGN PATENT DOCUMENTS

| JP | 5/341049 | 12/1993 |
| JP | 2002-350546 | 12/2002 |
| JP | 2008-263190 | 10/2008 |

(Continued)

*Primary Examiner* — Jurie Yun
(74) *Attorney, Agent, or Firm* — Finnegan, Henderson, Farabow, Garrett & Dunner, L.L.P.

(57) ABSTRACT

A method of manufacturing a radiation detector according to an embodiment includes: forming a plurality of scintillator array columns, each of the scintillator array columns being formed by preparing a scintillator member that a thickness being smaller than a length and a width, the scintillator member having a first face, a second face, a third face, and a fourth face, and being cut from the third face along the second direction to form at least a groove that penetrates from the first face to the second face but does not reach the fourth face to have an uncut portion near the fourth face; stacking the scintillator array columns in the first direction with a space between each of adjacent two scintillator array columns, and filling a spacer material into the space; inserting a reflector into each space and each groove; and cutting the uncut portion.

10 Claims, 10 Drawing Sheets

(56) References Cited

U.S. PATENT DOCUMENTS

2013/0125385 A1   5/2013   Shigekawa et al.

FOREIGN PATENT DOCUMENTS

| JP | 2009-58453 | 3/2009 |
| JP | 2015-55507 | 3/2015 |
| WO | WO 2012/147747 A1 | 11/2012 |

* cited by examiner

RADIATION DETECTOR, RADIATION DETECTION APPARATUS, AND METHOD OF MANUFACTURING RADIATION DETECTOR

CROSS REFERENCE TO RELATED APPLICATIONS

This application is based upon and claims the benefit of priority from prior Japanese Patent Application No. 2015-108765 filed on May 28, 2015 in Japan, the entire contents of which are incorporated herein by reference.

FIELD

Embodiments described herein relate generally to radiation detectors, radiation detection apparatuses, and methods of manufacturing radiation detectors.

BACKGROUND

Radiation detection apparatuses employing x-ray computed tomography (x-ray CT) include detectors in which multilayer elements, in each of which a scintillator element and a photoelectric conversion element are stacked, are arranged in rows and columns. Several methods are known for manufacturing arrays including rows and columns of scintillator elements. These methods have a problem of quality degradation such as bent cutting lines, broken elements, and chipping, which are caused during the formation of an array of minute scintillator elements with a high aspect ratio. This has made it difficult to maintain the uniformity in characteristics of the entire array.

DETAILED DESCRIPTION

A method of manufacturing a radiation detector according to an embodiment includes: forming a plurality of scintillator array columns, each of the scintillator array columns being formed by preparing a scintillator member defined by a thickness in a first direction, a length in a second direction, and a length in a third direction, the second direction and the third direction crossing the first direction, and the thickness in the first direction being smaller than the length in the second direction and the length in the third direction, the scintillator member having a first face crossing the first direction, a second face being opposed to the first face, a third face crossing the second direction, and a fourth face being opposed to the third face, and being cut from the third face along the second direction to form at least a groove that penetrates from the first face to the second face but does not reach the fourth face to have an uncut portion near the fourth face; stacking the scintillator array columns in the first direction with a space between each of adjacent two scintillator array columns, and filling a spacer material into the space between the adjacent scintillator array columns; inserting a reflector into each space and each groove of the stacked scintillator array columns; and cutting the uncut portion of each of the scintillator array columns that are stacked.

First Embodiment

Figure 1:
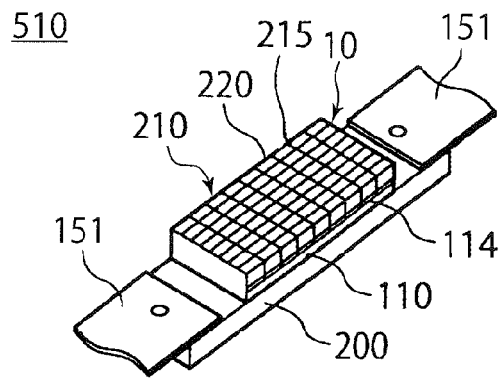
FIG. 1 is a perspective view of a radiation detector manufactured by a manufacturing method according to an embodiment.

A method of manufacturing a radiation detector according to a first embodiment will be described with reference to FIGS. 1 to 9. The radiation detector manufactured according to the first embodiment or any of second to fourth embodiments described later is included in a radiation detecting unit (a radiation detecting circuitry). FIG. 1 shows this radiation detecting unit. The radiation detecting unit 510 includes the radiation detector 10 fixed on an element support plate 200. The radiation detector 10 includes a photoelectric conversion layer 110 in which a plurality of photoelectric conversion elements 114 are disposed, and a scintillator array 210 on which scintillator elements that convert radiations rays to scintillation light rays are arranged in rows and columns. The photoelectric conversion layer 110 and the scintillator array 210 are bonded to each other to form a multilayer structure, in which the light receiving side of the photoelectric conversion layer 110 is bonded to the light emitting side of the scintillator array 210 by means of an adhesion layer.

The scintillator array 210 includes light reflecting layers 215 arranged with a predetermined pitch in two directions that are perpendicular to each other. The photoelectric conversion layer 110 and the scintillator array 210 are divided, by the light reflecting layers 215, into a plurality of photoelectric conversion elements 220 arranged in a matrix form. The photoelectric conversion elements 220 each include a scintillator element and a photoelectric conversion element 114 for converting scintillation light from the scintillator element to an electrical signal. The energy of incident radiation rays is detected for each of the photoelectric conversion elements 220. In FIG. 1, the reference numeral 151 indicates fittings for attaching the radiation detecting unit 510 to a collimator included in a radiation detection apparatus that will be described later.

Figure 2:
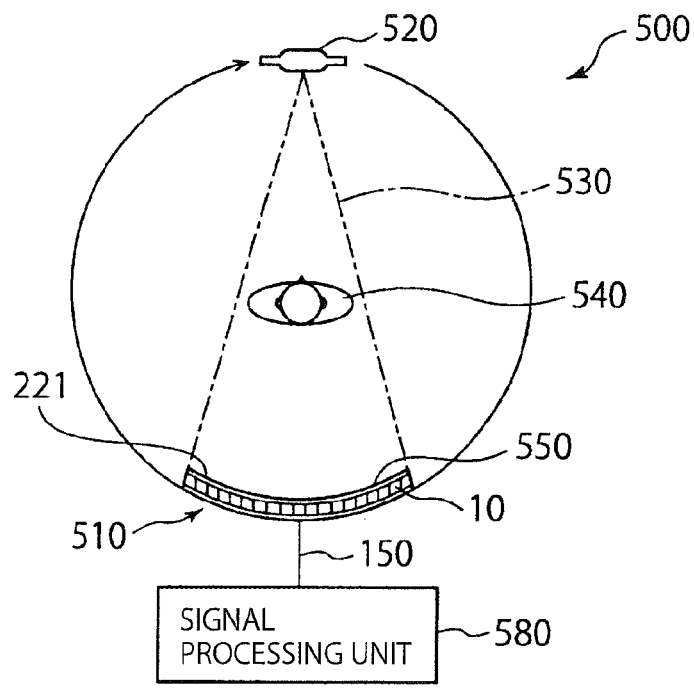
FIG. 2 is a diagram illustrating a radiation detection apparatus.

As show in FIG. 2, the radiation detection apparatus 500 includes a radiation tube 520, radiation detecting units 510 disposed to be opposed to a radiation tube 520, and a signal processing unit 580.

The radiation tube 520 emits radiation beams 530 such as x-rays to form a fan shape toward the radiation detecting unit 510. The radiation beams 530 emitted from the radiation tube 520 pass through an object 540 on a stage (not shown) to be incident on the radiation detecting unit 510.

The radiation detecting units 510 receive, at incident faces 221, the radiation beams 530 emitted from the radiation tube 520, a part of which pass through the object 540, convert the radiation beams 530 to visible light rays, and detect them as electrical signals.

The radiation detection apparatus 500 includes a plurality of radiation detecting units 510 that are substantially arranged on an arc, a collimator 550 disposed on the incident faces 221 of the radiation detecting units 510, and a signal processing unit (a signal processing circuitry) 580 connected to the radiation detecting units 510 via a signal line 150.

Each of the radiation detecting unit 510 converts radiations rays (radiation beams 530) from the incident faces 221 to visible light rays. Photoelectric conversion elements 114, which will be described layer, convert (by photoelectric conversion) the visible light rays to electrical signals.

The collimator 550 is an optical system disposed to the incident face 221 side of the radiation detecting units 510 to refract radiation rays so that they enter the radiation detecting units 510 in parallel to each other.

The signal processing unit 580 receives the electrical signals photoelectrically converted by the radiation detecting units 510 via the signal line 150, and calculates the energy of the radiation rays entering the radiation detecting units 510 on the basis of the values of the electrical signals. The signal processing unit 580 also generates, based on the energy levels of the radiation rays entering the radiation detecting units 510, a radiological image of the object 540, which may be colored depending on the materials of the object 540.

The radiation tube 520 and the radiation detecting units 510 are arranged to rotate around the object 540. This causes the radiation detection apparatus 500 to form a tomographic image of the object 540.

Figure 3:
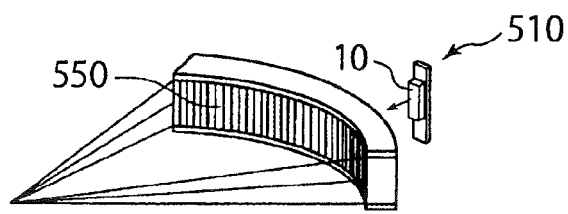
FIG. 3 is a diagram illustrating a relationship between radiation detecting units and a collimator.

As shown in FIG. 3, the radiation detecting units 510 are substantially arranged on an arc, and the collimator 550 is disposed on the side to which radiation rays are emitted.

The radiation detection apparatus 500 may be applied not only to form a tomographic image of a human being, animal, or plant, but also to serve as testing device for security devices, which make fluoroscopic images of the inside of an object.

FIGS. 4 to 9 show a process of manufacturing a scintillator array 210 of a radiation detector manufactured by a method according to a first embodiment.

Figure 4:
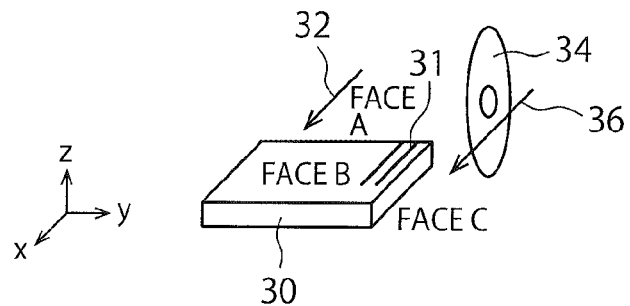
FIGS. 4 to 9 are diagrams illustrating a method of manufacturing a radiation detector according to a first embodiment.

A scintillator member 30 is prepared, with a thickness in a first direction (z direction) being shorter than a length in a second direction (x direction) and a length in a third direction (y direction), as shown in FIG. 4. For example, the thickness in the z direction is 0.45 mm, the vertical length (length in the x direction) is 10 mm, and the horizontal length (length in the y direction) is 30 mm. In FIGS. 4 to 9, a back side of the scintillator member 30 is defined as "face A" (third face), a top face is defined as "face B" (first face), and a right face is defined as "face C." The face A is a face to which radiation rays are emitted when the scintillator member 30 becomes scintillator elements. In FIG. 4, an arrow 32 indicates the direction along which the radiation rays are emitted.

Figure 5:
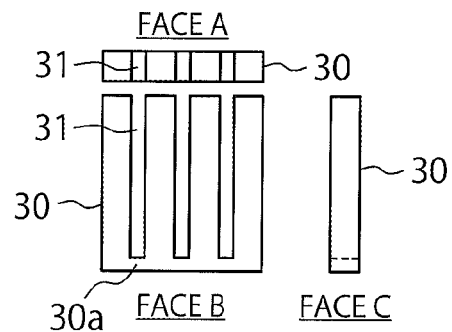

A blade 34 is rotated and moved from the face A along an arrow 36 to form a plurality of grooves 31 in the scintillator member 30. The grooves 31 penetrate the scintillator member 30 in the thickness direction from the face B (first face) to a face that is opposite to the face B (second face), but does not reach a face (fourth face) that is opposite to the face A (third face). Therefore, the grooves 31 are mere cuttings, and the end of the scintillator member 30 opposite to the face A is not cut (see FIG. 4). FIG. 5 shows the scintillator member 30 in this state. The reference numeral 30a in FIG. 5 indicates the uncut end. For a simplified explanation, there are three grooves 31 and four scintillator elements in FIG. 5. In actual cases, the number of grooves may be four or more, and the number of elements may be five or more, depending on the size of the scintillator member 30 and the total number of elements. This also applies to third to fourth embodiments described later. For example, since the scintillator member has a thickness of 0.45 mm, a vertical length (length in the x direction) of 10 mm, and a horizontal length (length in the y direction) of 30 mm in the first embodiment, there are 60 scintillator elements in the horizontal direction (y direction) if the width of each element is 0.45 mm, and the width of each groove 31 is 0.05 mm.

Figure 6:
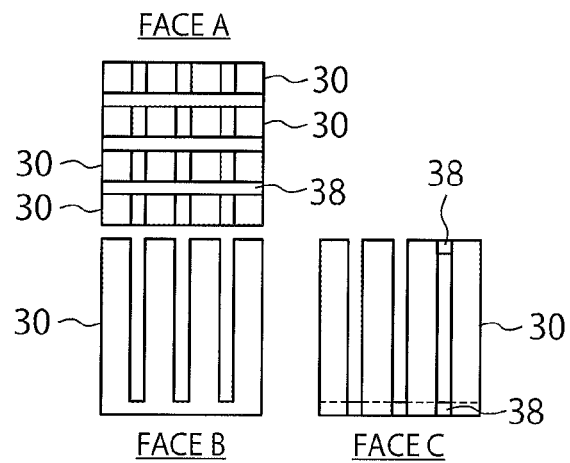

Subsequently, several scintillator members 30 each having the grooves 31 are stacked with a space between adjacent scintillator members 30 in a row direction (z direction) as shown in FIG. 6. For the simplification of the explanation, four scintillator members 30 are stacked in the row direction in FIG. 6. However, in actual cases, the number of members stacked in the row direction is determined by the number of required elements. Thereafter, a spacer 38 is disposed in each space between adjacent scintillator members 30 at least at one of the ends in the x direction.

Figure 7:
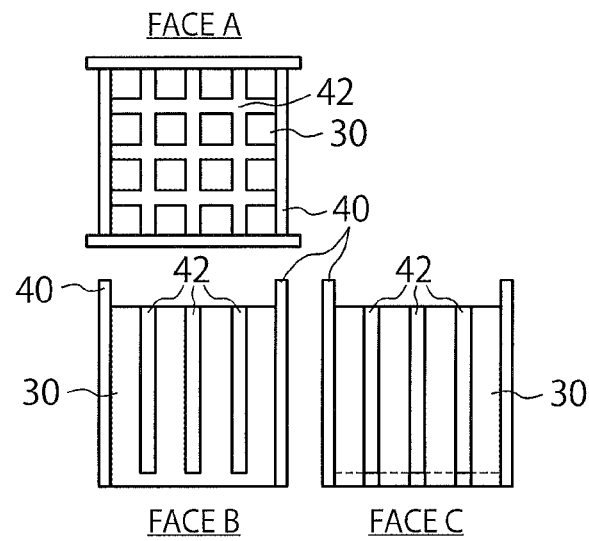

Then, as shown in FIG. 7, partition plates 40 are disposed on the side faces of the stacked scintillator members 30, when the face A is viewed as the top face. The partition plates 40 are used to fill a reflector 42 into the grooves 31 of each scintillator member 30 and the spaces between the scintillator members 30. Thereafter, the reflector 42 is filled.

Figure 8:
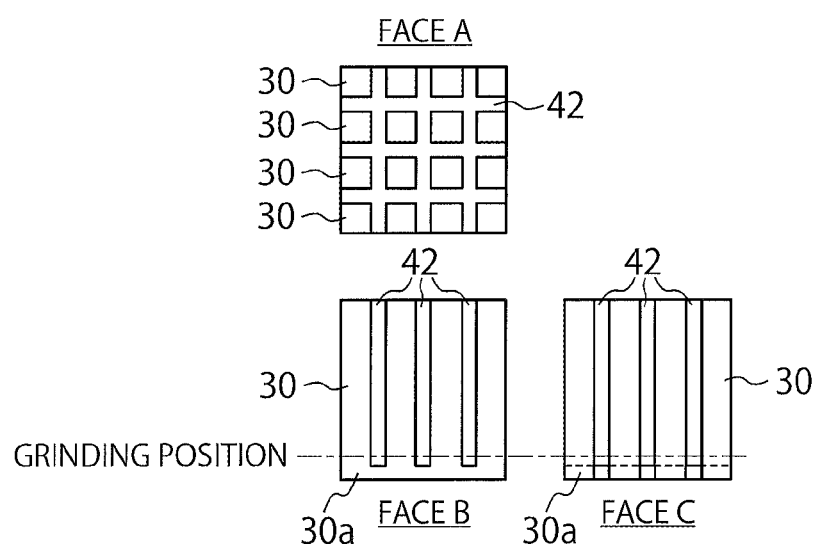
Figure 9:
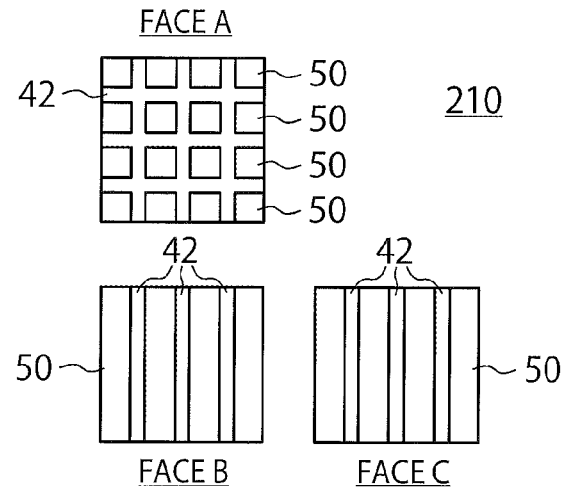

After the reflector 42 is dried, the partition plates 40 are removed. FIG. 8 shows the stacked scintillator members 30 in this state. The uncut end 30a of each scintillator member is removed by grinding or cutting as shown in FIG. 8. This results in a scintillator array 210 in which scintillator elements 50 are arranged in an array form as shown in FIG. 9.

Even if the vertical direction (x direction) of the scintillator member 30 is increased to increase the aspect ratio, minute scintillator elements may be manufactured easily by means of the manufacturing methods according to the first embodiment and second to fourth embodiments described later.

In the first embodiment and the second to fourth embodiments described later, the scintillator members are formed of, for example, such elements as $Ce:YAlO_3(YAP)$ and $Ce:(Lu, Y)_2SiO_5(LYSO)$. The materials of the scintillator elements, however, are not limited to these materials.

In the manufacturing method according to the first embodiment described above, a scintillator array including minute scintillator elements with a high aspect ratio may be easily manufactured with a high accuracy. Since the scintillator array is manufactured by forming grooves into a scintillator member with a thickness smaller than a length and a width, and stacking a plurality of such scintillator members with grooves, the occurrence of chipping and the generation of process-affected layers (with degraded characteristics) may be suppressed. Furthermore, scintillator elements that are minuter than those in manufactured by conventional methods may be manufactured. This improves the radiation counting rate per unit area.

Second Embodiment

A method of manufacturing a radiation detector according to a second embodiment will be described with reference to FIGS. 10 to 16. FIGS. 10 to 16 show a process of manufacturing a scintillator array 210 of the radiation detector manufactured by the method according to the second embodiment.

Figure 10:
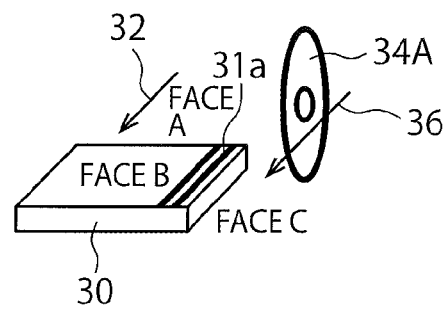
FIGS. 10 to 16 are diagrams illustrating a method of manufacturing a radiation detector according to a second embodiment.

A scintillator member 30, in which the thickness is smaller than the vertical and horizontal lengths is prepared, as shown in FIG. 10. For example, the scintillator member 30 has a thickness of 0.45 mm, a length in vertical direction of 2 mm, and a length in horizontal direction of 30 mm. In FIGS. 10 to 15, a back side face of the scintillator member 30 is defined as "face A," a top face is defined as "face B," and a right side face is defined as "face C." The face A is a face to which radiation rays are emitted when the scintillator member 30 is processed to become scintillator elements. In FIG. 10, an arrow 32 indicates the direction along which the radiation rays are emitted.

Figure 11:
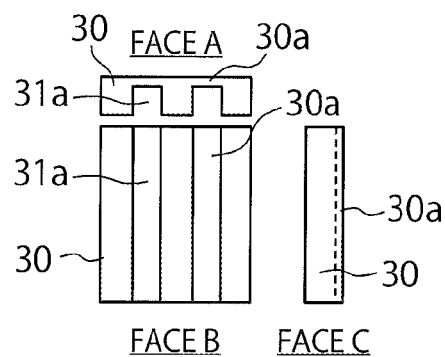

A blade 34A, which is thicker than the blade 34 used in the first embodiment, is rotated and moved from the face A along an arrow 36 to form a plurality of grooves 31a in the scintillator member 30. Unlike the grooves 31 of the first embodiment, the grooves 31a do not penetrate the scintillator member 30 in the thickness direction, but formed from the face A to a face opposite to the face A as recessed portions. Thus, a face opposite to the face B corresponds to an uncut end 30a (FIG. 11). The scintillator member 30, which has the grooves 31a in the face A, has a plurality of projecting portions. For the simplicity of explanation, the scintillator member 30 according to the second embodiment has two grooves 31a and three projecting portions as shown in FIG. 11. In actual cases, however, three or more grooves 31a may be formed, depending on the size of the scintillator member 30 and the number of scintillator elements. For example, the height and the width of each projecting portion are 0.3 mm and 0.2 mm, respectively, and the width of the recessed portion 31a is 0.22 mm.

Figure 12:
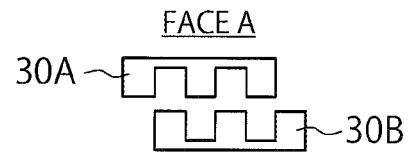
Figure 13:
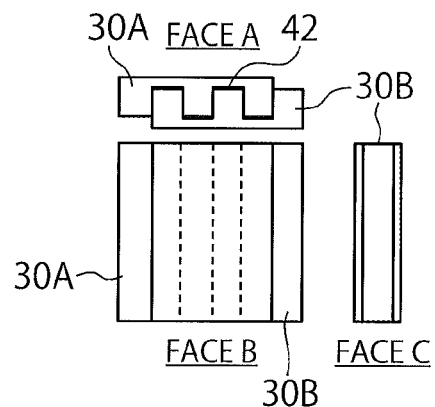

Two scintillator members, 30A and 30B, each having a plurality of grooves 31a are prepared, and arranged so that the face B with the grooves 31a of the scintillator member 30A faces the face B with the grooves 31a of the scintillator member 30B, as shown in FIG. 12. Subsequently, using a bonding agent 42 serving as a reflector, the scintillator members 30A and 30B are bonded to each other with the grooves 31a of the scintillator member 30A being engaged with the projecting portions of the scintillator member 30B (FIG. 13). In order to control the thickness of the bonding agent 42, spacers may be disposed between the scintillator member 30A and the scintillator member 30B.

Figure 14:
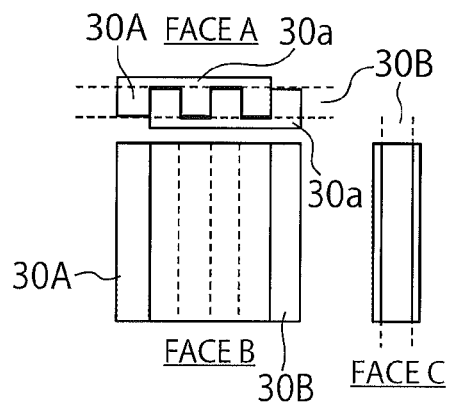
Figure 15:
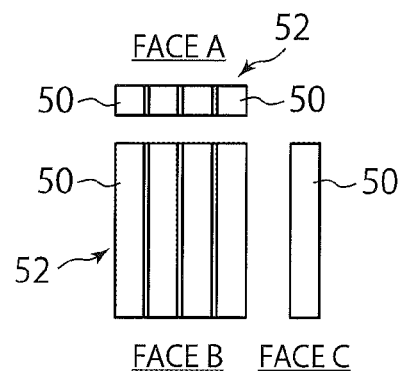

Thereafter, the uncut end 30a of each of the scintillator members 30A and 30B is removed by grinding or cutting (FIG. 14). This forms a single-column scintillator array 52 with four scintillator elements 50, as shown in FIG. 15. For the simplicity of explanation, the single-column scintillator array 52 includes four scintillator elements 50. However, the number of scintillator elements may be five or more. The width of each scintillator element 50 is 0.2 mm, and the interval between adjacent scintillator elements 50 is 0.01 mm.

Figure 16:
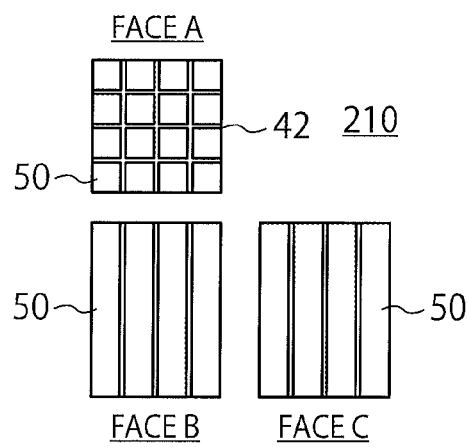

Several single-column scintillator arrays 52 are arranged in a row direction and bonded with a bonding agent 42, which will serve as a reflector, thereby forming a scintillator array included in a radiation detector (FIG. 16). In order to control the thickness of the bonding agent 42, spacers may be disposed between the scintillator member 30A and the scintillator member 30B.

As described above, the interval between adjacent scintillator elements may be reduced as compared to the interval in the first embodiment, and a scintillator array 210 in which scintillator elements are densely arranged may be manufactured according to the second embodiment. Therefore, the radiation counting rate per unit area may be further improved as compared to that of the first embodiment.

Furthermore, like the first embodiment, a scintillator array including minute scintillator elements with a high aspect ratio may be easily manufactured with a high accuracy according to the second embodiment. Since the scintillator array is manufactured by forming grooves into a scintillator member with a thickness smaller than a length and width, and stacking such scintillator members with the grooves, the occurrence of chipping and the generation of process-affected layers (with degraded characteristics) may be suppressed.

Third Embodiment

A method of manufacturing a radiation detector according to a third embodiment will be described with reference to FIGS. 17 to 22. FIGS. 17 to 22 show a process of manufacturing a scintillator array 210 included in a radiation detector manufactured by the method according to the third embodiment.

Figure 17:
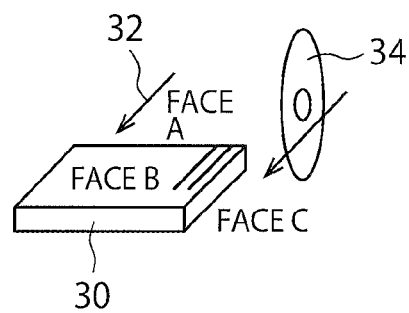
FIGS. 17 to 22 are diagrams illustrating a method of manufacturing a radiation detector according to a third embodiment.

First, a scintillator member 30 is prepared, in which the thickness is smaller than the vertical and horizontal lengths as shown in FIG. 17. For example, the thickness is 0.45 mm, the length in vertical direction is 2 mm, and the length in horizontal direction is 30 mm. In FIGS. 17 to 22, a back side face of the scintillator member 30 is defined as "face A," a top face is defined as "face B," and a right side face is defined as "face C." The face A is a face to which radiation rays are emitted when the scintillator member 30 is processed to become scintillator elements. In FIG. 17, an arrow 32 indicates the direction along which the radiation rays are emitted.

Figure 18:
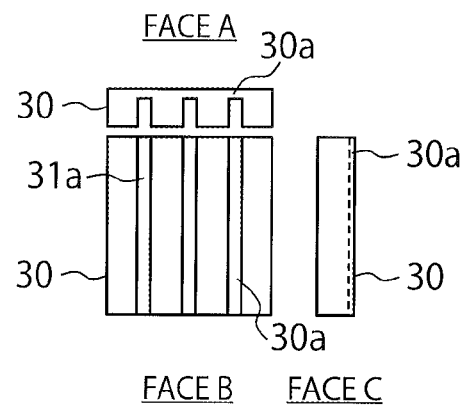

A blade 34, which is the same as that used in the first embodiment, is rotated and moved from the face A along an arrow 36 to form a plurality of grooves 31a in the scintillator member 30. Unlike the grooves 31 of the first embodiment, the grooves 31a do not penetrate the scintillator member 30 in the thickness direction, but formed from the face A to a face opposite to the face A. Thus, a face opposite to the face B corresponds to an uncut end 30a (FIG. 18). In FIG. 18, there are three grooves 31a. In the third embodiment, the scintillator member with a plurality of grooves 31a serves as a single-column scintillator array (scintillator array column) in which a plurality of scintillator elements are connected by the uncut end 30a.

Figure 19:
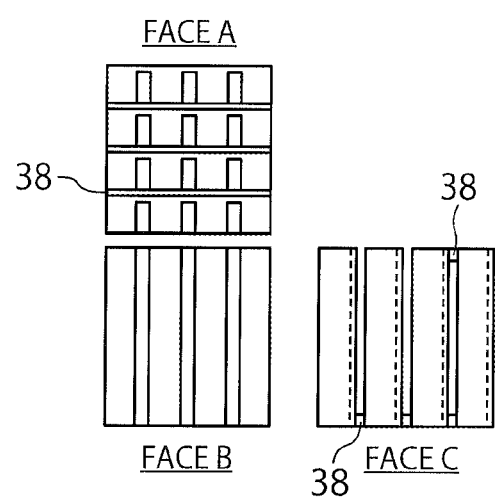

As shown in FIG. 19, several scintillator array columns 30 with the grooves 31a in the face A are arranged in the row direction. In FIG. 19, four scintillator array columns 30 are stacked in the row direction with a space being provided between adjacent scintillator array columns 30. Spacers 38 may be disposed to at least lower portions of each space between adjacent scintillator array columns 30. The spacers 38 may be disposed to the upper portions.

Figure 20:
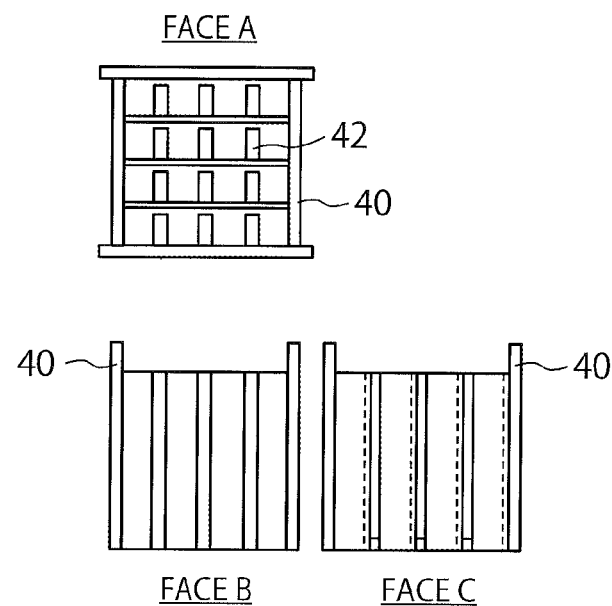

Subsequently, partition plates 40 are disposed to side faces of the stacked scintillator array columns 30 when the face A is positioned as a top face, as shown in FIG. 20. The partition plates 40 are used to fill a reflector 42 into the spaces and the grooves 31a in the stacked scintillator array columns 30 arranged in the row direction. The reflector 42 is filled into the spaces in the stacked scintillator array columns 30 in the row direction, and the grooves 31a.

Figure 21:
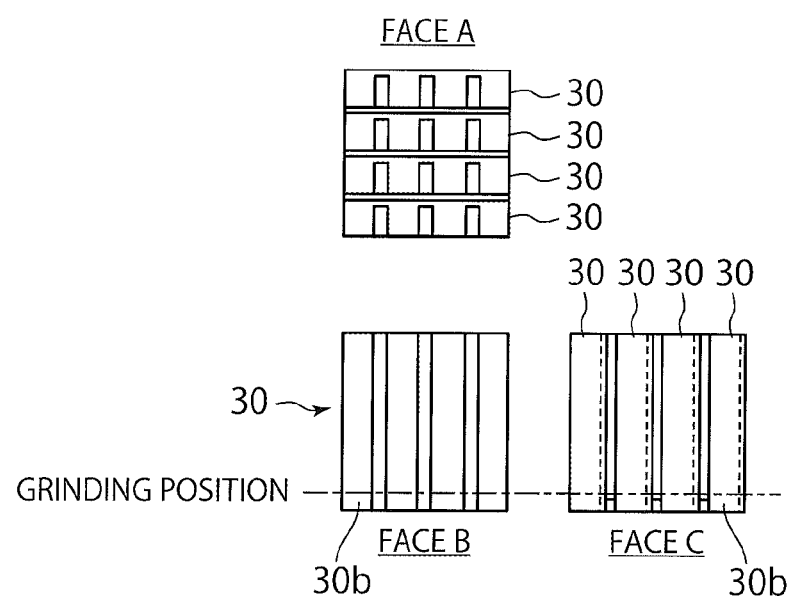
Figure 22:
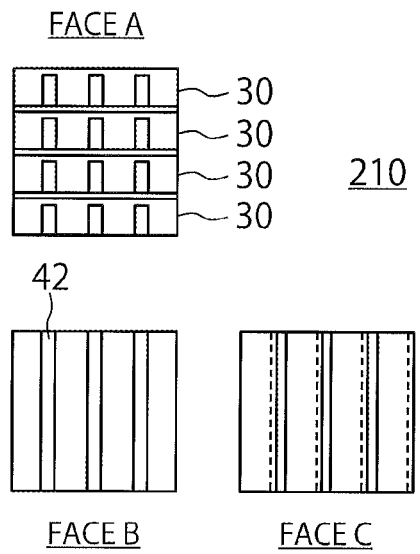

After the reflector 42 is dried, the partition plates 40 are removed. FIG. 21 shows the stacked scintillator array columns 30 in this state. Thereafter, the portions to which the spacers 38 are disposed in the scintillator array columns 30, for example portions 30b, as shown in FIG. 21, are removed by grinding or cutting. As a result, a scintillator array 210, in which the scintillator array columns 30 each having the grooves 31a are arranged in the row direction, is obtained as shown in FIG. 22.

Each of the scintillator array columns 30 with the grooves 31a of the scintillator array 210 has an uncut end 30a.

Like the first embodiment, a scintillator array including minute scintillator elements with a high aspect ratio may be easily manufactured with a high accuracy according to the third embodiment. Since the scintillator array is manufactured by forming grooves into a scintillator member with a thickness smaller than a length and a width, and stacking a plurality of such scintillator members with the grooves, the occurrence of chipping and the generation of a process-affected layer (with degraded characteristics) may be suppressed. Since the scintillator elements are smaller than those in conventional arrays, the radiation counting rate per unit area may be improved.

Fourth Embodiment

Figure 23:
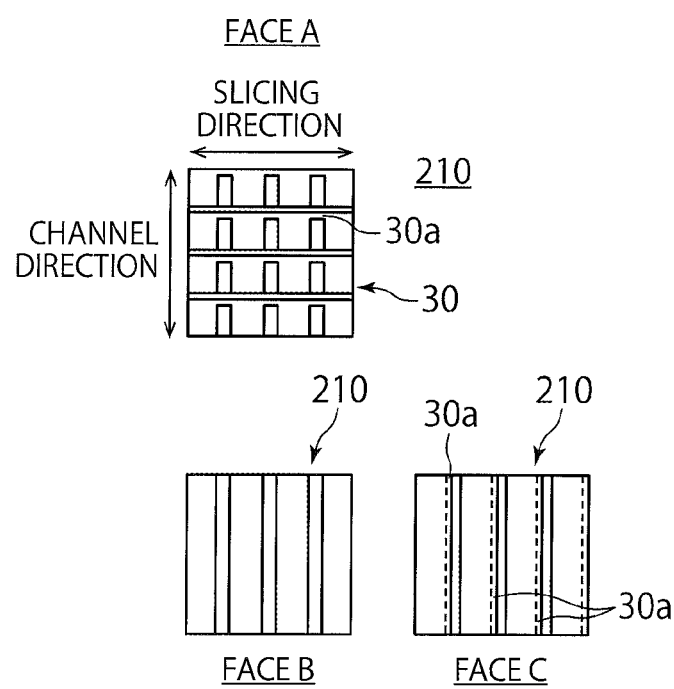
FIGS. 23 to 25 are diagrams illustrating a method of manufacturing a radiation detector according to a fourth embodiment.
Figure 24:
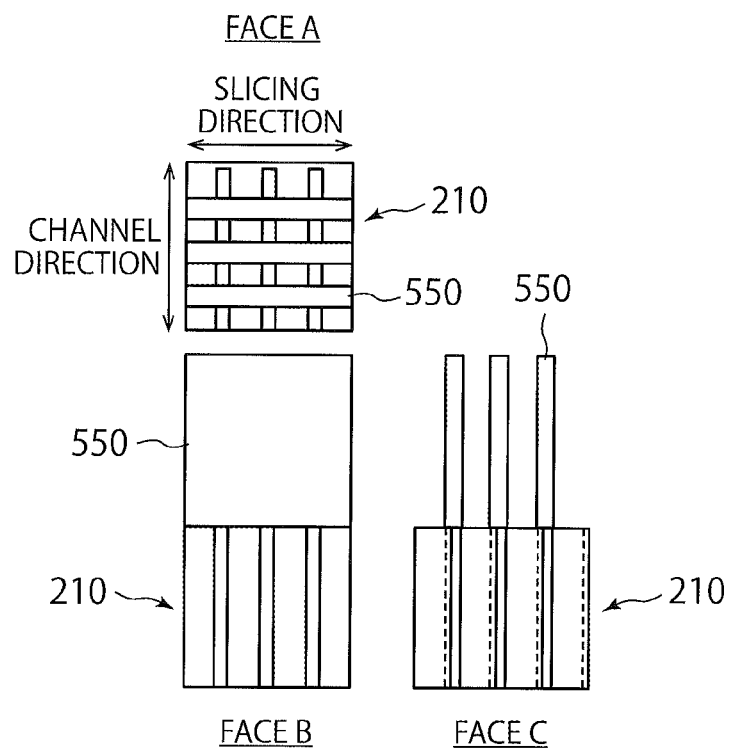
Figure 25:
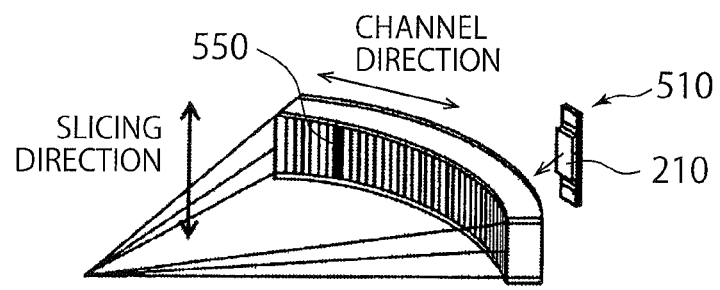

A method of manufacturing a radiation detector according to a fourth embodiment will be described with reference to FIGS. 23 to 25. FIGS. 23 to 25 show a process of manufacturing a scintillator array 210 included in a radiation detector manufactured by the method according to the fourth embodiment.

First, a scintillator array 210 manufactured by the method according to the third embodiment is prepared. FIG. 23 shows the scintillator array 210 viewed from a face A, a face B, and a face C. In the illustration of the face A, the horizontal direction is a direction along which an object is sliced, and the vertical direction is a channel direction. Since each of the scintillator array columns 30 has an uncut potion 30a extending in the slicing direction, cross talk of visible light may be generated. Since the scintillator array columns 30 are separated from each other by the uncut portions 30a in the channel direction, no cross talk of visible light may be generated.

In order to deal with this, the collimator 550 is placed in front of the scintillator array 210 of the radiation detecting unit 510 so that the uncut portion 30a of each of the scintillator array columns 30 extends in parallel to the slicing direction of the collimator 550, and, when viewed from the radiation direction (face A), the uncut portions 30a are covered by the collimator 550 in the manufacturing method according to the fourth embodiment. With this structure, radiation rays may be prevented from entering the uncut portions 30a of the scintillator array columns 30 by the collimator 550 as shown in FIGS. 24 and 25. As a result, the cross talk in the slicing direction may be prevented.

Like the third embodiment, a scintillator array with minute scintillator elements having a high aspect ratio may be manufactured with a high accuracy according to the fourth embodiment. Since the scintillator array is manufactured by forming grooves into a scintillator member with a thickness smaller than a length and a width, and stacking such scintillator members with the grooves, the occurrence of chipping and the generation of process-affected layers (with degraded of characteristics) may be suppressed. Since scintillator that are minuter than those in conventional cases may be manufactured, the counting rate of radiation rays per a unit area may be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of manufacturing a radiation detector comprising:
    forming a plurality of scintillator array columns, each of the scintillator array columns being formed by preparing a scintillator member defined by a thickness in a first direction, a length in a second direction, and a length in a third direction, the second direction and the third direction crossing the first direction, and the thickness in the first direction being smaller than the length in the second direction and the length in the third direction, the scintillator member having a first face crossing the first direction, a second face being opposed to the first face, a third face crossing the second direction, and a fourth face being opposed to the third face, and being cut from the third face along the second direction to form at least a groove that penetrates from the first face to the second face but does not reach the fourth face to have an uncut portion near the fourth face;
    stacking the scintillator array columns in the first direction with a space between each of adjacent two scintillator array columns, and filling a spacer material into the space between the adjacent scintillator array columns;
    inserting a reflector into each space and each groove of the stacked scintillator array columns; and
    cutting the uncut portion of each of the scintillator array columns that are stacked.

2. The method according to claim 1, wherein the groove is formed by a blade that is moved while rotating.

3. A method of manufacturing a radiation detector comprising:
    forming a plurality of scintillator members, each being defined by a thickness in a first direction, a length in a second direction, and a length in a third direction, the second direction and the third direction crossing the first direction, and the thickness in the first direction being smaller than the length in the second direction and the length in the third direction, each of the scintillator members having a first face crossing the first direction, a second face being opposed to the first face, a third face crossing the second direction, and a fourth face being opposed to the third face, and having recessed portions and projecting portions on the first face, the recessed portions and the projecting portions extending along the second direction from the third face to the fourth face, leaving an uncut portion near the second face being opposed to the first face on which the recessed portions and the projecting portions are formed;
    bonding two of the scintillator members with an adhesive so that the recessed portions of one of the two scintillator members are engaged with the projecting portions of the other;
    forming a scintillator array column by cutting the uncut portion of each of the two scintillator members that are bonded to each other;
    stacking a plurality of the scintillator array columns with a space between each of adjacent scintillator array columns arranged in the first direction; and
    inserting a reflector into each space between the adjacent two stacked scintillator array columns.

4. The method according to claim 3, wherein the adhesive has a function of reflecting light.

5. The method according to claim 3, wherein the recessed portions are formed by a blade that is moved while rotating.

6. A method of manufacturing a radiation detector, comprising:

forming a plurality of scintillator array columns, each of the scintillator array columns being formed by preparing a scintillator member defined by a thickness in a first direction, a length in a second direction, and a length in a third direction, the second direction and the third direction crossing the first direction, and the thickness in the first direction being smaller than the length in the second direction and the length in the third direction, each of the scintillator members having a first face crossing the first direction, a second face being opposed to the first face, a third face crossing the second direction, and a fourth face being opposed to the third face, and having recessed portions on the first face, the recessed portions extending along the second direction from the third face to the fourth face, leaving an uncut portion near the second face being opposed to the first face on which the recessed portions are formed;

stacking the scintillator array columns in the first direction with a space between each of adjacent scintillator array columns, and inserting a spacer material into the space; and filling a reflector into each space and each recessed portions of the scintillator array columns that are stacked to form a scintillator array.

7. The method according to claim 6, wherein a collimator is disposed in front of the scintillator array so that the uncut portions in the scintillator array are in parallel to a slicing direction of the collimator and hidden by the collimator when viewed from the first direction.

8. The method according to claim 6, wherein the recessed portions are formed by a blade that is moved while rotating.

9. A radiation detector comprising:
a scintillator array; and
a photoelectric conversion layer performing photoelectric conversion on light from the scintillator array,
the scintillator array including:
a plurality of scintillator array columns stacked in a first direction, each of the scintillator array columns being defined by a thickness in the first direction, a length in a second direction, and a length in a third direction, the first direction crossing the second direction and the third direction, the thickness in the first direction being smaller than the length in the second direction and the length in the third direction, each of the scintillator array columns having a first face crossing the first direction, a second face being opposed to the first face, a third face crossing the second direction, and a fourth face being opposed to the third face, each of the scintillator array columns also having recessed portions on the first face, the recessed portions extending in the second direction from the third face to the fourth face, and an uncut portion near the second face that is opposed to the first face on which the recessed portions are formed.

10. A radiation detection apparatus comprising:
the radiation detector according to claim 9;
a radiation tube disposed to be opposed to the radiation detector, the radiation tube emitting radiation rays that reach the radiation detector via an object; and
a signal processing unit processing a signal outputted from the radiation detector.

* * * * *